Nov. 9, 1937.　　　T. R. HARRISON　　　2,098,685
MEASURING APPARATUS
Filed Jan. 18, 1932　　　2 Sheets-Sheet 2

INVENTOR.
Thomas R. Harrison,
BY John E. Hubbell
ATTORNEYS.

Patented Nov. 9, 1937

2,098,685

UNITED STATES PATENT OFFICE 2,098,685

MEASURING APPARATUS

Thomas R. Harrison, Wyncote, Pa., assignor to The Brown Instrument Company, Philadelphia, Pa., a corporation of Pennsylvania Application January 18, 1932, Serial No. 587,211

10 Claims. (Cl. 73—206)

The present invention relates to measuring apparatus adapted for use under conditions making it desirable to modify the direct measure made of one quantity in accordance with the value of a related quantity of variable value, and the general object of the present invention is to provide improved apparatus for the purpose specified. My improved apparatus is characterized primarily by the inclusion therein of a power actuated or relay mechanism utilized in periodically effecting such adjustments of the apparatus as are required for the automatic modification of the direct measure of the first mentioned quantity to suitably compensate for the effect of the second mentioned quantity.

While not restricted to such use, my invention was primarily devised for, and is of a special utility in measuring fluid flow under conditions making it desirable to compensate for variations in the quality of the fluid flowing such as variations in the temperature or pressure of the fluid. For example, in measuring the flow of saturated steam through a conduit by directly measuring a pressure drop or differential which is a function of the velocity of flow the relation between said pressure differential and the quantity of flow formed by the said pressure differential varies with the pressure of the steam. In effect, the actual quantity rate of flow in such case is the product of two factors one of which is a function of the pressure differential, and the other of which is a function of the pressure of the steam.

Various forms of flow measuring apparatus including provisions for compensating for variations in the quality of the fluid flowing have been proposed heretofore by others, but I believe myself to be the first to utilize a power actuated or relay mechanism in effecting the adjustments of flow measuring apparatus to compensate for the effect of changes in the quality of the fluid. The use of such mechanism is especially important in cases where significant errors may result from a failure to properly compensate for changes in fluid pressure or temperature, which are too small to be effectively utilized in directly creating the forces required to effect compensating adjustments of the measuring apparatus through compensating provisions which are sufficiently simple, reliable, compact and inexpensive. My invention also comprises various novel features of construction and arrangement.

The various features of novelty which characterize my invention are pointed out with particularity in the claims annexed to and forming a part of this specification. For a better understanding of the invention, however, and the advantages possessed by it reference should be had to the accompanying drawings and descriptive matter in which I have illustrated and described a preferred embodiment of the invention.

Figure 1:
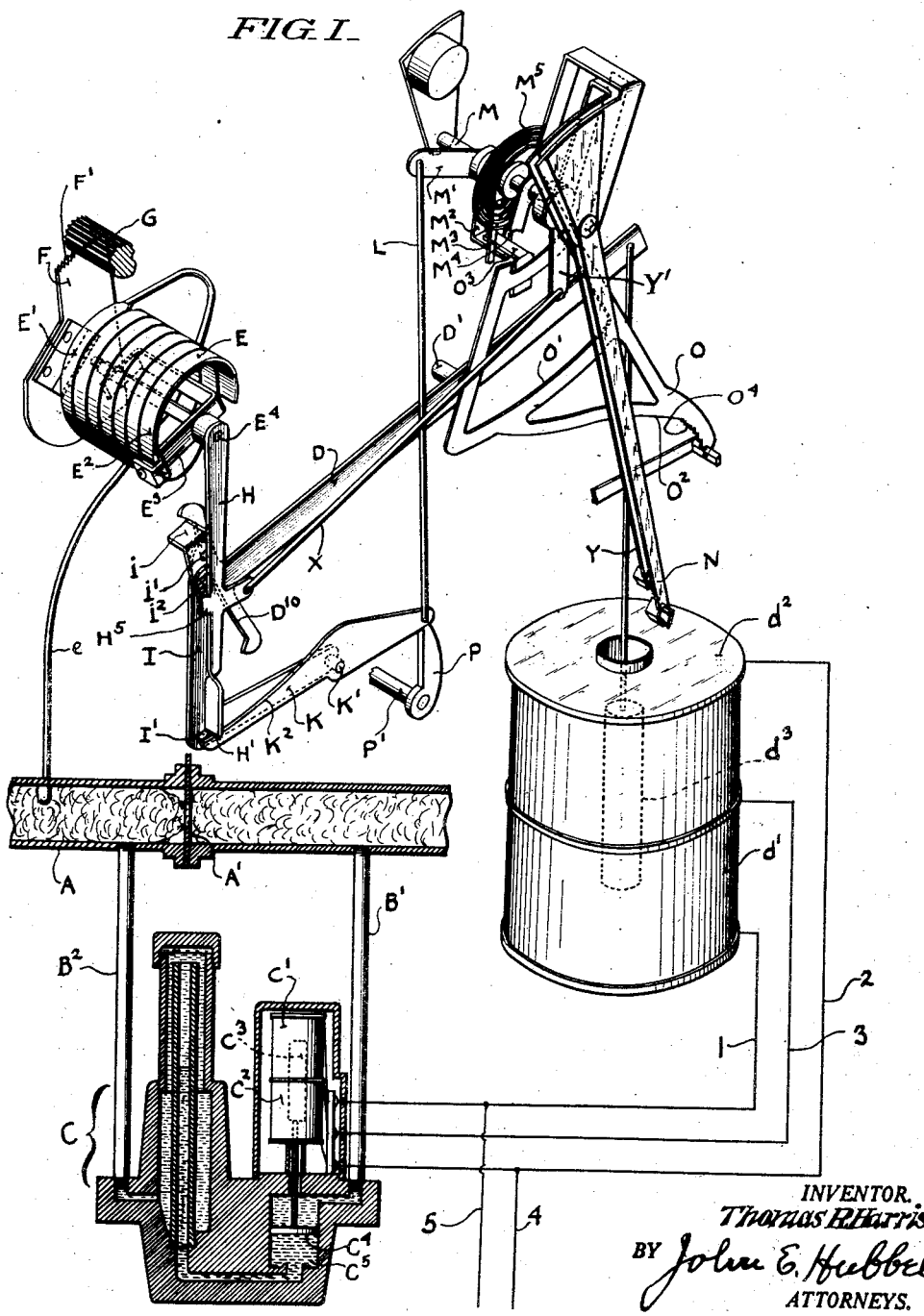
Fig. 1 is a diagrammatic representation of flow measuring apparatus including essential features of one embodiment of the present invention.

In the flow measuring apparatus shown diagrammatically in Fig. 1, A represents a steam conduit provided with a restricted measuring orifice A', and B' and B² represent branch conduits transmitting the static pressure in the conduit A at the high and low pressure sides, respectively, of the orifice A' to a differential pressure device or manometer C. The differential pressure thus impressed on the manometer is employed in a known manner to adjust a lever D about its fulcrum axis D' into an angular position which depends upon and is thus a direct measure of said differential pressure. The angular position at any time of the member D is thus a direct measure of the function of flow through the orifice A' which is represented by or corresponds to the differential pressure transmitted to the manometer.

As shown the means through which the angular position of the lever D is made dependent upon the differential pressure to which the manometer is subjected, are of the type disclosed in my prior Patent 1,743,852, granted January 14, 1930, and comprises an inductance bridge. The latter includes end to end coils $C'$ and $C^2$ axially receiving an armature $C^3$ carried by a float $C^4$ resting upon the body of mercury $C^5$ or other manometer sealing liquid. The coils $C'$ and $C^2$ are connected in series with one another, and are connected by conductors 1 and 2 in parallel with two end to end coils $d^2$ and $d'$ which are connected in series with one another. The junction point of the coils $C'$ and $C^2$ is connected to the junction point of the coils $d'$ and $d^2$ by a conductor 3. The inductance bridge is energized by conductors 4 and 5 connected to the conductors 1 and 2, respectively, and leading from a suitable source of alternating current. The coils $d'$ and $d^2$ receive an axially movable magnetic core $d^3$ link connected to the lever D. With the mechanical system including the lever D in gravital balance, the up and down movements of the core $C^3$ axially of the coils $C'$ and $C^2$, produce corresponding down and up movements of the core $d^3$ in the manner disclosed in said prior patent.

In accordance with the present invention the static pressure in the conduit A is transmitted to a pressure responsive device E, by a branch conduit or pressure transmitting pipe $e$ which may open to the conduit A at either side of the orifice $A'$, and at a suitable distance from the latter to avoid the local pressure variations due to flow occurring in immediate proximity to the orifice. As shown the pressure responsive device E comprises a flattened tube bent into a helix and having one end $E'$ anchored to a normally fixed support F. Advantageously and as shown the support F is pivotally connected to the framework of the exhibiting instrument which includes the lever D and coils $d'$ and $d^2$, and may be adjusted angularly about the axis of the helically wound pipe E for calibration purposes. As shown such adjustment is effected by forming the support F with a gear segment $F'$ in mesh with an adjusting gear G. The end $E^2$ of the helical pipe is connected to a rocking arm $E^3$ forming part of a rocker element pivoted to turn about the axis of the device E and having an axially extending shaft portion $E^4$ carrying an arm H. The angular position of the arm H thus varies with and is a measure of the static pressure in the conduit A transmitted through the pipe $e$ to the pressure responsive device E.

The position of the arm H which measures the static pressure in the conduit A, and the position of the member D which measures the pressure differential due to flow through the conduit A collectively determine the position of a member K and thereby collectively measure the quantity flow through the conduit. The member K is shown as pivotally supported on a lever I. The angular position of the latter is directly dependent on the angular position of the lever D and the position of the member K relative to the lever I is directly dependent on the position of the arm H.

Figure 2:
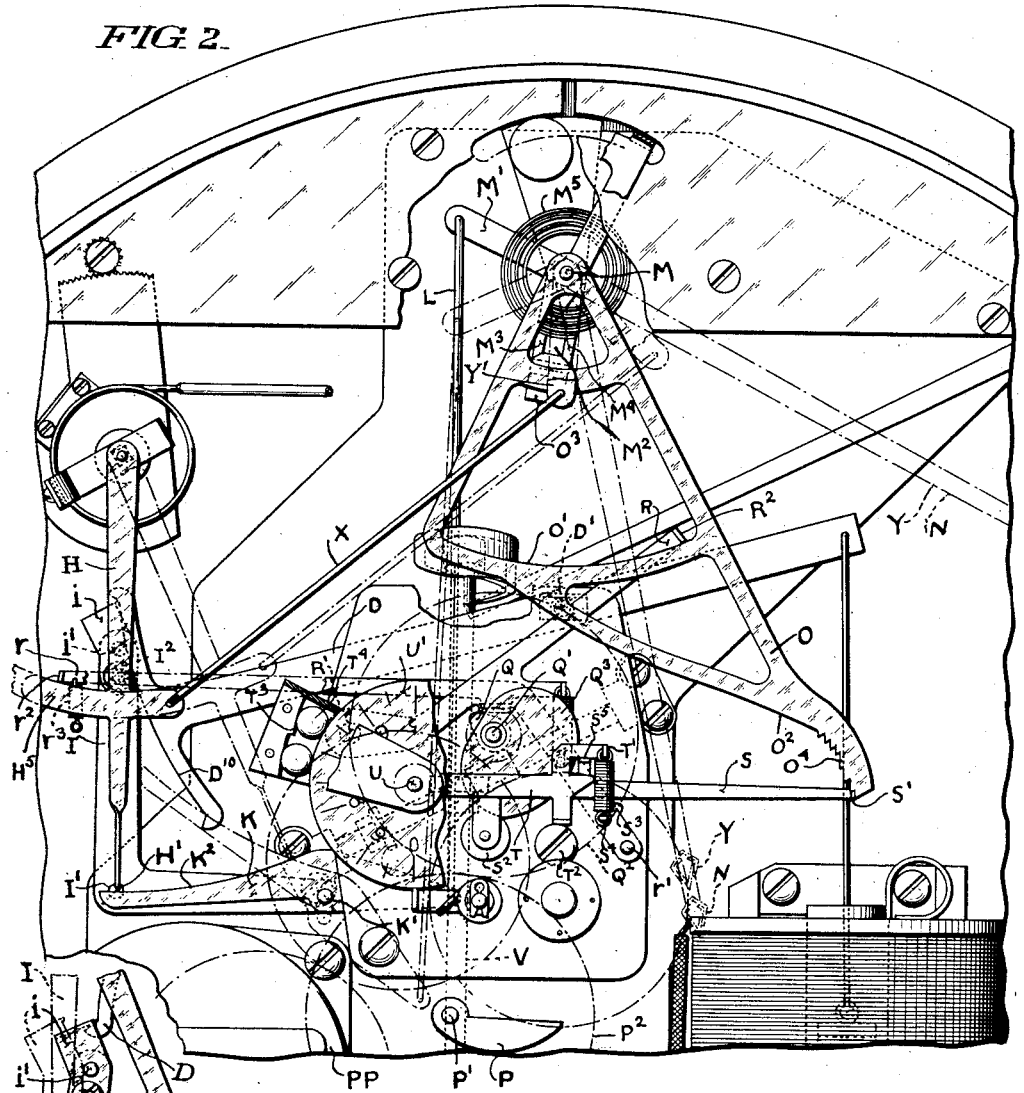
Fig. 2 is an elevation of a portion of flow measuring apparatus including the form of the invention illustrated in Fig. 1.
Figure 3:
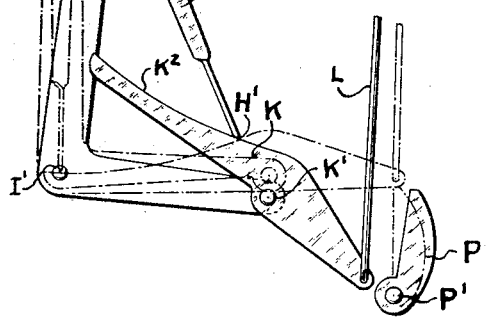
Fig. 3 is an elevation of a portion of the apparatus shown in Fig. 2 with parts shown in different relative positions.

As shown the member I is a bell crank lever pivotally mounted on a stud or pivot pin $I'$ carried by the instrument framework. The lever I has a gravital tendency to turn clockwise as seen in Figs. 1, 2 and 3 into the position in which an engaging part $i$ carried by the uprising arm of the lever I engages a transversely elongated cam shoulder $D^{10}$ carried by the adjacent end of the lever D. The part $i$ is pivoted to the lever I at $i'$ and may be secured to the lever by a clamping screw $i^2$ in any angular adjustment required for the calibration of the apparatus. The cam shoulder $D^{10}$ is so shaped as the lever D turns clockwise from its zero flow position shown, in Fig. 2, into its maximum flow position, the lever I turns clockwise from its position shown in Fig. 2 into its position shown in full lines in Fig. 3.

The lever K is pivotally connected by a pivot pin $K'$ to the free end of the horizontally disposed arm of the lever I. The end of the lever K at the righthand side of the pivot $K'$, as seen in Figs. 2 and 3, is connected by a link L to an arm $M'$ of a deflecting element including a shaft M which carries a recording pen N and in the construction illustrated, also carries the control element O of a flow integrating mechanism. The lever K has a gravital tendency, which may be due wholly or mainly to the link L and associated parts, to turn in the clockwise direction as seen in Figs. 2 and 3, into the position in which a cam edge or shoulder $K^2$ of the lever K engages the knife edge $H'$ at the free end of the member H. By suitably shaping the cam shoulder $D^{10}$ of the member D, the angular adjustments of the deflecting element resulting from changes in position of the lever D may be in linear proportion to the changes in fluid flow producing said changes in the position of the lever D.

When the pressure is acting on the device E is such as to require no pressure compensating effect, the arm H occupies the position shown in Fig. 2 and the knife edge $H'$ is then coincident with the axis of the pivot pin $I'$. In this position of the arm H, the position, relative to the lever I, of the lever K, when the latter is in engagement with the knife edge $H'$, is not affected by the changes in position of the lever I which result from changes in position of the lever D. When the pressure transmitted to the device E increases so that compensation is required, the arm H is displaced in the counter-clockwise direction from its position shown in full lines in Fig. 2, and the knife edge $H'$ then engages the cam edge $K^2$ of the lever K at a point displaced to the right from the pivot pin $I'$ as shown in Fig. 3. When such engagement occurs the angular position of the lever K with respect to its pivot $K'$ as well as the position of the latter will depend upon the position of the lever I and thereby upon the position of the lever D. The cam edge $K^2$ is in the form of an arc of a circle of a radius equal to the distance between the axis of the member H and its knife edge $H'$. In consequence when there is no flow through the conduit A, and the pressures transmitted to the two legs of the manometer C are therefore equal, the position of the lever K when in engagement with the edge $H'$ is the same for all positions of the latter. At that time the deflecting parts M, N and O should occupy their zero flow positions regardless of the pressure transmitted to the device E.

In the usual operating condition in which the pressure transmitted to the device E is sufficient to displace the arm H in the counter-clockwise direction somewhat from its full line position shown in Fig. 2, and in which there is flow through the conduit A and the lever I is displaced from its zero flow position, the position of the member K when its edge $K^2$ is in engagement with the knife edge $H'$ depends both on the position of the arm H and upon the position of the lever I. In any given position of the arm H, its compensating effect on the position of the lever K is dependent upon and increases with the angular displacement of the lever I in the clockwise direction from the position shown in Fig. 2. In other words the position of the lever K when in engagement with the arm H indicates the product of the flow quantity factor indicated by the position of the lever I, and a pressure compensating factor indicated by the position of the arm H.

As before stated, the lever K has a gravital tendency to turn into the position in which its edge $K^2$ engages the knife edge end $H'$ of the arm H. If the engagement of the edges $H'$ and $K^2$ were continuous, it would offer frictional resistance to the movement of the arm H in response to changes in the pressure transmitted to the device E. Such frictional resistance would necessarily introduce errors when the pressure transmitted to the device E is small, even though the device E could be made more powerful in its action than is desirable from the instrument construction standpoint, or indeed than is practically possible in some cases.

In accordance with the present invention adequate freedom of the arm H to adjust its position in accordance with the pressure transmitted to the device E is secured by periodically interrupting the engagement between the edges $K^2$ and $H'$. As shown in the drawings, such periodical interruption is effected by a wiper cam P carried by a shaft $P'$ forming part of a power actuated or relay mechanism including an electric clock motor PP or analogous power device by which the shaft $P'$ is constantly rotated. Once during each revolution of the shaft $P'$, the cam P engages the arm of the lever K at the right of the pivot pin $K'$, as seen in Figs. 2 and 3, and thereby gives the lever K a counter-clockwise movement about its pivot pin $K'$ which moves the edge $K^2$ away from the edge $H'$. When the cam P moves out of engagement with the lever K the latter turns clockwise into the position in which its edge $K^2$ engages the edge $H'$ of the arm. During the period in which the edge $K^2$ is held out of contact with the edge $H'$, the arm H is free to move into the position corresponding to the pressure then transmitted to the device E.

The movement given by the cam P to the lever K and the following return movement of the latter into engagement with the arm H, give corresponding movements to the link L and arm $M'$. Corresponding movements of the shaft M and parts N and O may advantageously be prevented, as by the provision of a yielding connection between the arm $M'$ and the shaft M and of means for holding the shaft M against angular movement during each period in which the cam P interrupts the engagement of the parts K and H. As shown the yielding connection provided for this purpose comprises an arm $M^2$ secured to the arm $M'$, an arm $O^3$ carried by the part O and thereby secured to the shaft M, two arms $M^3$ and $M^4$ journalled on the shaft M, and a spiral spring $M^5$ surrounding the shaft M with one end secured to the arm $M^3$ and the other to the arm $M^4$. The spring $M^5$ tends to move the arms $M^3$ and $M^4$ angularly toward one another into positions in which they engage the opposite sides of the arms $M^2$ and $O^3$ and thereby tend to hold the last mentioned arms in their normal side by side relation shown in Fig. 1. The means shown in the drawings for periodically holding the shaft M against angular movement comprises a locking lever R pivoted at $R'$ and having a projection $R^2$ gravitally or spring biased to move into locking engagement with a locking edge or shoulder $O'$ of the member O when permitted so to do. Periodically the locking lever R is moved out of engagement with the shoulder $O'$ by a cam Q carried by a constantly rotating shaft $Q'$. As shown the shafts $P'$ and $Q'$ are geared together by meshing spur gears $P^2$ and $Q^2$ secured to the shafts $P'$ and $Q'$, respectively.

In the instrument shown, the element O forms the controlling element of an integrating mechanism periodically actuated by the motor or analogous power actuated device giving motion to the shafts P and $Q'$. As shown this integrating mechanism includes a compound lever comprising lever parts S and T separately journalled on a shaft U. Said compound lever includes portions at the left of the shaft U, as seen in Fig. 2, giving the lever a gravital tendency to turn about the shaft U in the counter-clockwise direction, as seen in Fig. 2, until the end $S'$ of the lever part S engages a cam edge $O^2$ provided for the purpose on the member O. Periodically the arm S is moved in the clockwise direction from its then position of engagement with the shoulder $O^2$ into an initial position by a cam $Q^3$ which is carried by the shaft Q and which acts on a cam roll $S^2$ carried by the arm S. A spring $S^3$ connected at one end to a projection $S^4$ from the arm S and at its opposite end to a projection $T'$ from the part T normally hold the projection $T'$ in engagement with a projection $S^5$ of the part S, so that the compound lever parts S and T tend to turn together. An adjustable stop shown as a screw head $T^2$ arrests the clockwise movement of the part T and fixes the initial position of the latter.

Each movement of the part T from its initial position into the position in which the lever part S engages the shoulder $O^2$ gives a corresponding turning movement in a clockwise direction to an integrator disc $U'$ secured on the shaft U. To this end the part T is provided with a ball-way $T^3$ receiving clutch balls $T^4$ which engage the periphery of the disc $U'$ and cause the latter to turn with the part T on each movement of the latter in the clockwise direction as seen in Fig. 2. The extent of each such angular movement imparted to the disc $U'$ obviously depends upon the angular position of the member O since that position determines the point along the cam edge or shoulder $O^2$ engaged by the projection $S'$ from the lever part S. The shaft U is gear connected to a shaft V which is employed to actuate a counting train which may be of any ordinary design.

The action of the cams P and Q are so relatively timed that the locking arm is in locking engagement with the member O during the period in which the part S is in engagement with the member O, as well as throughout the period during which the member K is out of engagement with the arm H. As the lower portion of the member O engaged by the part S at low flows is so disposed relative to the path of movement of the projection $S'$ of the lever part S, that the latter would have some appreciable tendency to cam the member O in the counter-clockwise direction if said lower portion of the edge $O^2$ were a continuous curve, said portion may advantageously be broken up into a series of shoulders $O^4$ as shown.

The arm H and lever K may be so disposed as to practically eliminate any tendency to angular displacement of the arm H as a result of its engagement by the lever K. However, in the instrument shown such displacement is positively prevented by locking means holding the arm H against angular movement during the period in which the knife edge $H'$ and surface $K^2$ are in engagement. The locking means illustrated for this purpose are analogous to those provided for the member O and comprise a locking lever $r$ pivoted at $r'$ and biased by a spring $r^3$ to move into a position in which a projection $r^2$ from the lever $r$ engages an arc-shaped locking edge or surface at the upper side of a lateral projection $H^5$ from the arm H. The lever $r$ is engaged and lifted out of engagement with the projection $H^5$ by the cam Q, during each period in which that cam engages and lifts the previously described locking lever R.

In order that the pressure transmitted to the device E may be suitably exhibited, the arm H is connected by a link X to a part $Y'$ secured to a pen arm Y journalled on the shaft M. The pen arms N and Y are adapted to regard the quantity of flow and static pressure of the fluid flow, respectively, on a record disc, not shown, but which may be rotated in the usual manner by the same timing motor or analogous power device employed to give motion to the cam shafts P and Q.

Novel features of the integrating mechanism, including the control element O and the parts through which the latter controls the actuation of the counting train, which are illustrated and described, but are not claimed herein, are claimed in my prior application Serial No. 585,212, filed January 7, 1932.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention what I claim as new and desire to secure by Letters Patent, is:

1. Flow measuring apparatus comprising in combination a member, means responsive to the velocity of flow of a fluid for adjusting said member into different positions in accordance with changes in said velocity, a second member, means responsive to a quality of said fluid for adjusting said second member into different positions in accordance with changes in said quality, a deflecting element adapted to oscillate about an axis, and power actuated means for periodically adjusting said element angularly about said axis in a direction and to an extent depending upon the positions of said members at the time at which said adjustment is effected relative to the positions of said members at the time at which the immediately preceding periodical adjustment of said element was effected.

2. Apparatus for measuring the rate of flow of fluid comprising in combination, means responsive to the velocity of said flow, a member adjusted by said means into a position varying with said velocity, means responsive to the pressure of said fluid, a member adjusted by the last mentioned means into a position varying with said pressure, a flow exhibiting element adapted to oscillate about an axis, and power actuated means for periodically adjusting said element angularly about said axis in a direction and to an extent depending upon the positions of said members at the time at which said adjustment is effected relative to the positions of said members at the time at which the immediately preceding periodical adjustment of said element was effected.

3. Measuring apparatus comprising in combination a movable measuring element, a movable compensating element and exhibiting means jointly controlled by the positions occupied by said elements including a movable part and power actuated means for moving said part alternately into and out of a position in which it is in mechanical engagement with each of said members, said position being selectively dependent upon the position then occupied by each of said members.

4. Apparatus for measuring the rate of flow of a fluid comprising in combination a member the position of which varies with the velocity of said flow, a second member tending to occupy a position varying in accordance with a quality of the fluid, a third member pivotally connected to the first mentioned member and biased to turn relatively thereto into a position in which it engages and has its motion arrested by said second member in a position relative to the first member varying with the position of the second member, an exhibiting element, means operatively connecting said exhibiting element to said third member and power actuated means periodically moving said third member out of engagement with said second member thereby giving the latter freedom for adjustment in accordance with changes in said quality.

5. Flow measuring apparatus comprising in combination a member the position of which is dependent upon the velocity of a flowing fluid, a member tending to occupy a position varying in accordance with changes in a quality of the fluid, a third member adjustably mounted on the first mentioned member, means periodically moving said third member relative to the first mentioned member into and out of engagement with said second member, an exhibiting element, means operatively connecting said exhibitor element and said third member, said means including a yielding connection tending to adjust said element in accordance with the changes in position of said third member, and means for holding said element against said movement while said third member is out of engagement with said second member.

6. Measuring apparatus comprising in combination a deflecting member, a cooperating member, one of said members having a cam surface elongated in the direction of the path of deflection of the first mentioned member and the other member having a part adapted to engage with said cam surface at different points along its length according to the deflection of the first mentioned member, means for periodically moving said cooperating member to effect alternate engagements and separations of said part and surface, an exhibiting element deflecting about an axis, a mechanical connection between said element and said cooperating member through which movements of the latter tend to produce corresponding deflection movements of said element, said connection including a portion yielding to permit said element to be held stationary, and means holding said element stationary during the periodical movements of said cooperating member and releasing said element during said engagements.

7. A gas meter, comprising a rocking-lever-and-link-system, a driving mechanism for a counting device, the said lever-and-link-system serving for the transmission of movement to the said driving mechanism and having parts which are movable relatively to the other parts to thereby cause alterations of the excursions of the driving end of the said system, a device responsive to a physical condition of the gas to be measured, means for associating a movable part of said device with the said relatively movable parts of the said lever-and-link-system, a periodically acting braking mechanism acting on a part of the associating means between the said device responsive to a physical condition of the gas and the said relatively movable parts of the lever-and-link-system, said braking mechanism permitting the said device to influence the lever-and-link-system when this system is at one end of its rocking movement.

8. A meter, comprising a rocking-lever-and-link-system, a driving mechanism for a counting device, the said lever-and-link-system serving for the transmission of movement to the said driving mechanism and having parts which are movable relatively to the other parts to thereby cause alterations of the excursions of the driving end of the said system, a device responsive to a physical condition of the material measured, means for associating a movable part of said device with the said relatively movable parts of the said lever-and-link-system, a periodically acting braking mechanism acting on a part of the associating means between the said device and the said relatively movable parts of the lever-and-link-system, said braking mechanism permitting the said device to influence the lever-and-link-system when this system is at one end of its rocking movement.

9. Measuring apparatus comprising in combination, means responsive to variations in one measurable condition, a member adjusted by said means into a position varying with said condition, means responsive to a second condition, a member adjusted by the last mentioned means into a position varying with said second condition, an exhibiting element adapted to oscillate about an axis, power actuated means for periodically adjusting said element angularly about said axis in a direction and to an extent depending upon the position of said members at the time at which said adjustment is effected relative to the positions of said members at the time at which the preceding periodical adjustment was effected, and means for maintaining said exhibiting element in the position into which it is adjusted at each periodical adjustment until the following periodical adjustment of said element.

10. Measuring apparatus comprising in combination, means responsive to variations in a measurable condition, a member adjusted by said means into a position varying with said condition, an exhibiting element adapted to oscillate about an axis, a second element adapted to oscillate about said axis, power actuated means for periodically adjusting said second element angularly about said axis in a direction and to an extent depending upon the position of said member at the time at which said adjustment is effected relative to the position of said member at the time at which the preceding periodical adjustment was effected, resilient means tending to move the first mentioned element into an angular position about said axis corresponding to the position of the second mentioned element and means periodically releasing the first mentioned element for adjustment by the said resilient means and for maintaining said exhibiting element in the position into which it is adjusted at each periodical adjustment until the following periodical adjustment of said second element.

THOMAS R. HARRISON.